United States Patent [19]

Lunder

[11] Patent Number: 5,683,736
[45] Date of Patent: Nov. 4, 1997

[54] PROCESS FOR THE PREPARATION OF A POWDERED INSTANT BLACK TEA DRINK MIX

[75] Inventor: Tito Livio Lunder, Morges, Switzerland

[73] Assignee: Nestec S.A., Vevey, Switzerland

[21] Appl. No.: 521,854

[22] Filed: Aug. 31, 1995

[30] Foreign Application Priority Data

Sep. 3, 1994 [EP] European Pat. Off. ............... 94113824

[51] Int. Cl.$^6$ ................................. A23F 3/16; A23F 3/72
[52] U.S. Cl. .................. 426/597; 426/435; 426/422
[58] Field of Search ........................... 426/597, 435, 426/422

[56] References Cited

U.S. PATENT DOCUMENTS

| | | | |
|---|---|---|---|
| 3,192,048 | 6/1965 | Liddiard | 426/435 |
| 3,669,680 | 6/1972 | Gurkin | 99/77 |
| 3,950,553 | 4/1976 | Gasser et al. | 426/435 |
| 4,357,361 | 11/1982 | Lunder et al. | 426/435 |
| 4,472,441 | 9/1984 | Clark et al. | 426/435 |
| 4,490,402 | 12/1984 | Lunder et al. | 426/435 |
| 4,552,769 | 11/1985 | Lunder et al. | 426/435 |
| 4,668,525 | 5/1987 | Creswick | 426/435 |
| 5,198,259 | 3/1993 | Hoogstad | 426/435 |
| 5,532,012 | 7/1996 | Balentine et al. | 426/435 |

FOREIGN PATENT DOCUMENTS

| | | |
|---|---|---|
| 0 067 351 | 12/1982 | European Pat. Off. . |
| 01 10 391 | 6/1984 | European Pat. Off. . |
| 01 98 209 | 10/1986 | European Pat. Off. . |
| 02 01 000 | 12/1986 | European Pat. Off. . |

*Primary Examiner*—Anthony J. Weier
*Attorney, Agent, or Firm*—Pennie & Edmonds LLP

[57] ABSTRACT

A powdered black tea drink mix is prepared by subjecting to extraction with hot water at a temperature of between about 60° and 130° C., separating the tea leaves from the extract; concentrating this first extract to a solids content of between about 5 and 12% and cooling the first extract to a temperature of between 5° and 15° C. in order to form an insoluble tea cream which is separated from the first concentrated extract. This tea cream is mixed with the spent black tea leaves or with green tea leaves to form a mixture which is extracted with water at a temperature greater than about 70° C. in order to obtain a second extract which is separated from the spent leaves. The first and the second extracts are mixed, concentrated to the desired solids content and dried to form the powdered drink mix.

20 Claims, No Drawings

PROCESS FOR THE PREPARATION OF A POWDERED INSTANT BLACK TEA DRINK MIX

TECHNICAL FIELD

The invention relates to a process for the preparation of instant black tea drink mix in the form of a powder which can be added to cold water to form a black tea drink that is substantially free of cloudiness due to insoluble precipitates.

BACKGROUND OF THE INVENTION

Process are known for the preparation of an instant black tea powder drink mix which is soluble in cold water, in which the black tea leaves are subjected to extraction with hot water at a temperature of between 60° and 130° C., the tea leaves are separated, this first extract is concentrated to a solids content of between 5 and 12% and cooled to a temperature of between 5° and 15° C. in order to form an insoluble cream which is separated form the first concentrated extract.

It is known that extracts based on black tea and especially instant black tea give a cloudy drink at room temperature. This cloudiness is caused by a precipitate of a complex between caffeine and polyphenols, which is designated by the name "tea cream". The tea cream is insoluble in cold water and some additional treatment of the extracted black tea is usually necessary in order to achieve solubility of the entire mix in cold water. Otherwise, the tea cream is discarded.

Processes are now known for the extraction of black tea which make it possible to at least partially recover the tea cream. European patent Application 198209 already relates to a process for the preparation of instant black tea soluble in cold water, in which the procedure is carried out as stated above, except that the tea cream is subjected to extraction with water, giving a second extract which is separated from the remaining tea cream before the first and second extracts are mixed and dehydrated. A disadvantage of this process is that when the first extract is concentrated and cooled, there are substances which are not part of the tea cream which co-precipitate. Thus, in the subsequent extraction of the tea cream, it is in particular the substances which are not part of the tea cream which are recovered. The result is that in the final analysis only a small portion of what is called tea cream is recovered in the drink.

The aim of the present invention is to develop a process in which the tea cream is really recovered in a simple manner without increasing the extraction and product manufacturing costs.

SUMMARY OF THE INVENTION

The present invention relates to a process for the preparation of a black tea powder product which comprises treating black tea leaves with water at a sufficient temperature for a sufficient time to form a first extract and spent black tea leaves; concentrating the first extract to increase the solids content; cooling the concentrated extract to precipitate an insoluble tea cream containing residue; mixing the residue with one of the spent black tea leaves or green tea leaves to form a first mixture; treating the mixture with water at a sufficient temperature and for a sufficient time to obtain a second extract; mixing portions of the first and second extracts to form an extract mixture; and drying the extract mixture to form the black tea powder product.

The black tea leaves may be treated with water at a temperature of between about 60° and 130° C. The period of time for the extraction depends upon the degree of extraction desired, and can easily be determined by one of ordinary skill in the art through simple testing. Preferably, the treatment is performed for a period of time sufficient to obtain a substantially constant Brix (a refractometric measurement that provides the concentration of solids in the extract) for the first extract. The concentrated extract is then cooled to between about 5° and 15° C. to precipitate the residue. Advantageously, the residue can be mixed with the spent black tea leaves which are separated from the first extract. Also, the residue can be mixed with green tea leaves to form the first mixture, wherein the quantity of green tea leaves is less than the quantity of black tea leaves used to form the fist extract.

Preferable, the first mixture is treated with water at a temperature of between about 70° and 95° C. for between about 60 and 100 minutes. Also, the second extract is clarified before mixing with the first extract. This process also contemplates concentrating the extract mixture before drying, preferably by spray-drying.

DETAILED DESCRIPTION OF THE INVENTION

The invention relates to a process for the preparation of instant black tea soluble in cold water, in which the procedure is carried out as noted above. Importantly, the tea cream separated from the first extract is mixed with the spent black tea leaves or with green tea leaves, the mixture is extracted with water at a temperature greater than about 70° C. to as high as about 100° C. in order to obtain a second extract which is separated from the spent leaves, the first and the second extracts are mixed, concentrated to the desired solids content and dried.

Without wishing to be tied to a scientific theory, it is possible according to the process of the invention to recover substantially all the tea cream, because in the spent black tea leaves and in the green tea leaves, there are substances which most probably decomplex the caffeine constituent of the tea cream. This decomplexing allows the production of a powder which is substantially free of insoluble components and is thus freely soluble in cold water. There is also no loss of solids. On the contrary, the heating of the tea cream with the leaves makes it possible to further recover additional solids, thereby increasing the yield of the final powder product.

In the present description, black tea is understood to mean the product of the enzymatic oxidation of green tea, while green tea is understood to mean the material obtained from the tea tree *Camellia sinensis*. It should be understood that the green tea has undergone practically no fermentation converting it to black tea.

The quantity of water used for each extraction is between about 2 and 25 parts by weight of water per part of dry tea leaves, preferably from about 4 to 15 parts and more particularly between about 5 and 12 parts. The duration of the first extraction may be from about 1 up to 30 minutes, preferably between about 2 and 15 minutes and more particularly between about 5 and 12 minutes.

The temperature of the water used for the first extraction can vary, but is advantageously at least about 60° C. up to as high as about 125° C. This temperature is preferably between about 75° and 110° C. and more particularly between about 85° and 105° C. The period of time required for the extraction depends upon the degree of extraction desired, and can easily be determined by one of ordinary skill in the art through simple testing. Preferably, the treatment is performed for a period of time sufficient to obtain a substantially constant Brix for the first extract. The Brix is a refractometric measurement that provides the concentration of solids in the extract.

The first extract is concentrated under reduced pressure, preferably in order to obtain a dry matter content of between about 6 and 11% and more particularly between about 7 and 9%. After concentration, the first extract is cooled so that the tea cream precipitates; it is preferably cooled to between about 7° and 12° C., more particularly between about 9° and 11° C.

The tea cream is separated before being mixed with the green leaves. This separation is done either by filtration or by centrifugation. The tea cream can be added to spent black tea leaves or green tea leaves to form a mixture which is placed under reflux with the same quantity of water as mentioned above, for a duration of between about 60 and 100 minutes, preferably between about 70 and 90 minutes, at a temperature of between about 70° and 95° C. The residual tea cream is finally separated as noted above, by filtration or centrifugation.

If green tea leaves are used in the mixture for the second extraction, a quantity of between about one-third and one-fifth of that of the starting black tea leaves are used.

The first extraction is carried out either by percolation or countercurrent-wise procedures, whereas the second extraction is carried out mainly by percolation. The percolation extraction is preferably carried out with stirring in a vessel containing water, the spent leaves and the cream.

The first and the second extracts are then mixed and concentrated to the desired solids content so as to arrive at the drying system with a higher dry matter content. This concentration is expected to be carried out to a solids content of between 15 and 25% by weight.

The drying of the concentrated extract can be carried out either by spray-drying, or by freeze-drying.

The process according to the invention can be carried out on all types of black tea and on mixtures thereof.

The instant tea obtained according to the process of the invention is 100% natural, is substantially completely soluble in cold water to a desired taste level, can be iced, and leads to a stable drink having excellent organoleptic properties, especially the required astringency.

The amount of powder to be added to water to form the black tea drink is between about 0.2 to 0.4% based upon the amount of water. The amount added will depend upon the desired taste of the drink. Generally, between about 0.06 and 0.12 grams per 30 cc water are suitable for most peoples' tastes.

EXAMPLES

The rest of the description is presented with reference to the examples which illustrate preferred embodiments of the invention.

Example 1

100 g of black tea leaves which are ground in order to increase their surface area for extraction are placed under percolation in a crucible made of sintered glass with 2000 ml of water heated to 95° C. The water is recycled through the bed of leaves until the extract has a constant degree Brix.

This first extract is concentrated to about 8° Brix, cooled in ice or in the refrigerator to 10° C. It is then centrifuged and the supernatant constitutes the first concentrated extract.

The residue formed by the tea cream and the spent leaves is suspended in water, poured into a vessel where the remainder of the spent leaves is added. Water is added in order to obtain a water:residue ratio of 20:1. A condenser is provided and the mixture is placed under reflux for 90 minutes in order to give extract 2.

The leaves are separated, extract 2 is clarified and mixed with the first extract. This mixture is then concentrated to a dry matter content of 25% and spray-dried in order to obtain a powder which is soluble in cold water.

The powder is added to water to form a reconstituted black tea drink. This drink exhibits no cloudiness or precipitate when placed in a refrigerator at 5° C.

Example 2

100 g of black tea leaves which are ground in order to increase their surface area for extraction are placed under percolation in a crucible made of sintered glass with 2000 ml of water heated to 95° C.

The water is recycled through the bed of leaves until the extract has a constant degree Brix. This first extract is concentrated to about 8° Brix cooled in ice or in the refrigerator to 10° C. It is then centrifuged and the supernatant constitutes the first extract.

The residue formed by the tea cream is suspended in water and poured into a vessel containing 30 g of green tea leaves. Water is added in order to obtain a water:residue ratio of 20:1. A condenser is provided and the mixture is placed under reflux for about 90 minutes in order to give extract 2.

The leaves are separated, extract 2 is clarified and mixed with the first extract. This mixture is then concentrated to a dry matter content of 25% and spray-dried in order to obtain a powder which is soluble in cold water. The powder can be added to water to form a reconstituted, tasty drink which is not cloudy.

If the mixture of extract 1 and 2 is stored in liquid form and frozen, the mixture will retain all its clarity both when frozen and after melting.

The process according to the invention makes it possible to prepare an instant powder in which a large part of the tea cream has been recovered without as a result causing cloudiness in the reconstituted drink.

What is claimed is:

1. A process for the preparation of a black tea powder product which comprises:

treating black tea leaves with water at a temperature of between about 60° and 130° C. for a sufficient time to form a first extract and spent black tea leaves;

concentrating the first extract to increase the solids content;

cooling the concentrated first extract to precipitate an insoluble tea cream containing residue;

separating said insoluble tea cream containing residue from said cooled and concentrated first extract to yield a separated first extract;

mixing the separated residue with one of the spent black tea leaves or green tea leaves to form a first mixture, wherein the quantity of green tea leaves, if used, is less than the quantity of black tea leaves used to form the first extract;

treating the first mixture with water at a temperature greater than 70° C. up to about 100° C. for a sufficient time to obtain a second extract;

separating said second extract from said treated mixture to yield a separated second extract;

mixing portions of the separated first extract and separated second extract to form an extract mixture; and drying the extract mixture to form the black tea powder product.

2. The process of claim 1 wherein the black tea leaves are treated with water until the first extract has a substantially constant Brix.

3. The process of claim 1 wherein the concentrated extract is cooled to between about 5° and 15° C. to precipitate the residue.

4. The process of claim 1 wherein the residue is mixed with spent black tea leaves which are separated from the first extract.

5. The process of claim 1 wherein the separated insoluble tea cream containing residue is mixed with green tea leaves to form the first mixture.

6. The process of claim 1 wherein the first mixture is treated with water at a temperature of between about 70° and 95° C.

7. The process of claim 6 wherein the first mixture is treated with water for between about 60 and 100 minutes.

8. The process of claim 1 wherein the separated second extract is clarified before mixing with the separated first extract.

9. The process of claim 1 which further comprises concentrating the extract mixture before drying.

10. The process of claim 1 wherein the extract mixture is dried by spray-drying.

11. The process of claim 5 wherein the quantity of green tea leaves is between about one fifth and one third of the quantity of black tea leaves used to form the first extract.

12. A process for the preparation of a tea powder product which comprises:

treating black tea leaves with water at a temperature of between about 60° and 130° C. for a sufficient time to form a first extract and spent black tea leaves;

concentrating the first extract to increase the solids content;

cooling the concentrated first extract to precipitate an insoluble tea cream containing residue that includes a caffeine constituent;

separating said insoluble tea cream containing residue from said cooled and concentrated first extract to yield a separated first extract;

mixing the separated residue with the spent black tea leaves to decomplex the caffeine constituent and convert water insoluble tea cream constituents into water soluble ones, thus forming a first mixture;

treating the first mixture with water at a temperature greater than 70° C. up to about 100° C. for a sufficient time to remove water soluble tea cream constituents and to obtain a second extract;

separating said second extract from said treated mixture to yield a separated second extract;

mixing portions of the separated first extract and separated second extract to form an extract mixture; and drying the extract mixture to form the tea powder product.

13. The process of claim 11 wherein the black tea leaves are treated with water until the first extract has a substantially constant Brix.

14. The process of claim 11 wherein the concentrated extract is cooled to between about 5° and 15° C. to precipitate the residue.

15. The process of claim 11 wherein the separated insoluble tea cream containing residue is mixed with spent black tea leaves which are separated from the first extract.

16. The process of claim 11 which further comprises mixing the separated insoluble tea cream containing residue with green tea leaves to form the first mixture, wherein the quantity of green tea leaves is between about one fifth and one third of the quantity of black tea leaves used to form the first extract.

17. The process of claim 11 wherein the first mixture is treated with water for between about 60 and 100 minutes.

18. The process of claim 11 wherein the separated second extract is clarified before mixing with the separated first extract.

19. The process of claim 11 which further comprises concentrating the extract mixture before drying.

20. The process of claim 11 wherein the extract mixture is dried by spray-drying.

* * * * *